(12) United States Patent
Lin et al.

(10) Patent No.: US 11,199,982 B2
(45) Date of Patent: Dec. 14, 2021

(54) DATA STORAGE DEVICE AND CONTROL METHOD FOR NON-VOLATILE MEMORY

(71) Applicant: Silicon Motion, Inc., Jhubei (TW)

(72) Inventors: Ting-Han Lin, Zhubei (TW); Che-Wei Hsu, Taichung (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 16/505,231

(22) Filed: Jul. 8, 2019

(65) Prior Publication Data

US 2020/0081621 A1 Mar. 12, 2020

Related U.S. Application Data

(60) Provisional application No. 62/728,134, filed on Sep. 7, 2018.

(30) Foreign Application Priority Data

Mar. 8, 2019 (TW) ................................ 108107912

(51) Int. Cl.
*G06F 3/06* (2006.01)
*G06F 9/50* (2006.01)
*G06F 12/02* (2006.01)

(52) U.S. Cl.
CPC ............ *G06F 3/064* (2013.01); *G06F 3/0607* (2013.01); *G06F 3/0658* (2013.01); *G06F 3/0679* (2013.01); *G06F 9/5022* (2013.01); *G06F 12/0246* (2013.01)

(58) Field of Classification Search
None
See application file for complete search history.

(56) References Cited

U.S. PATENT DOCUMENTS

| | | | | |
|---|---|---|---|---|
| 7,609,564 | B2* | 10/2009 | Blum | G06F 12/0246 365/189.011 |
| 8,040,744 | B2* | 10/2011 | Gorobets | G06F 12/0246 365/200 |
| 8,205,036 | B2 | 6/2012 | Chen et al. | |
| 8,225,028 | B2* | 7/2012 | Kuo | G06F 12/0246 711/103 |

(Continued)

FOREIGN PATENT DOCUMENTS

| | | |
|---|---|---|
| CN | 103218306 A | 7/2013 |
| CN | 104598167 A | 5/2015 |

(Continued)

OTHER PUBLICATIONS

Non-Final Office Action dated Aug. 25, 2020, issued in U.S. Appl. No. 16/505,192 (copy not provided).

*Primary Examiner* — Elias Mamo
(74) *Attorney, Agent, or Firm* — McClure, Qualey & Rodack, LLP (57) ABSTRACT

High-efficiency control technology for non-volatile memory is shown. A controller allocates spare blocks of a non-volatile memory to provide a first active block and writes data issued by a host to the first active block. When the number of spare blocks is less than a threshold number and valid data of a first source block is less than a critical data amount, the controller uses the first active block as a data transfer destination for the valid data from the first source block.

12 Claims, 5 Drawing Sheets

(56) References Cited

U.S. PATENT DOCUMENTS

| | | | | |
|---|---|---|---|---|
| 8,356,136 B2* | 1/2013 | Chang | ................ | G06F 12/0246 711/103 |
| 8,402,228 B2* | 3/2013 | Anand | .................... | G06F 9/544 711/147 |
| 8,886,990 B2* | 11/2014 | Meir | ................... | G06F 12/0246 714/6.1 |
| 9,021,177 B2* | 4/2015 | Segal | ................. | G06F 12/0246 711/103 |
| 9,747,201 B2* | 8/2017 | Tien | .................... | G06F 12/0246 |
| 2006/0161722 A1 | 7/2006 | Bennett et al. | | |
| 2007/0168632 A1 | 7/2007 | Zeevi et al. | | |
| 2007/0234183 A1 | 10/2007 | Hwang et al. | | |
| 2012/0084490 A1 | 4/2012 | Choi et al. | | |
| 2012/0159051 A1 | 6/2012 | Hida et al. | | |
| 2013/0132640 A1 | 5/2013 | Wu et al. | | |
| 2013/0173875 A1 | 7/2013 | Kim et al. | | |
| 2016/0078966 A1 | 3/2016 | Li et al. | | |
| 2016/0188455 A1 | 6/2016 | Patel | | |
| 2017/0199703 A1 | 7/2017 | Ravimohan et al. | | |
| 2017/0221584 A1 | 8/2017 | Chen et al. | | |
| 2018/0150390 A1 | 5/2018 | Chien et al. | | |
| 2018/0165009 A1* | 6/2018 | Hsiao | .................... | G06F 3/0655 |
| 2018/0275887 A1 | 9/2018 | Yang et al. | | |
| 2019/0108119 A1 | 4/2019 | Gholamipour et al. | | |

FOREIGN PATENT DOCUMENTS

| | | |
|---|---|---|
| CN | 104732153 A | 6/2015 |
| CN | 107817943 A | 3/2018 |
| CN | 107943710 A | 4/2018 |
| TW | I604441 B | 11/2017 |
| TW | I613652 B | 2/2018 |
| TW | I615710 B | 2/2018 |
| TW | I627531 B | 6/2018 |

* cited by examiner

DATA STORAGE DEVICE AND CONTROL METHOD FOR NON-VOLATILE MEMORY

CROSS REFERENCE TO RELATED APPLICATIONS

This Application claims the benefit of U.S. Provisional Application No. 62/728,134, filed on Sep. 7, 2018, the entirety of which is incorporated by reference herein.

This Application also claims priority of Taiwan Patent Application No. 108107912, filed on Mar. 8, 2019, the entirety of which is incorporated by reference herein.

BACKGROUND OF THE INVENTION

Field of the Invention

The present invention relates to control techniques for non-volatile memory.

Description of the Related Art

There are various forms of non-volatile memory (NVM) for long-term data storage, such as flash memory, magnetoresistive RAM, ferroelectric RAM, resistive RAM, spin transfer torque-RAM (STT-RAM), and so on. These non-volatile memories may be used as a storage medium in a data storage device.

Non-volatile memory typically has its own specific storage characteristics. There is a need in the art for the development of control techniques for the specific storage characteristics of non-volatile memory.

BRIEF SUMMARY OF THE INVENTION

In accordance with an exemplary embodiment of the disclosure, a data storage device has a non-volatile memory and a controller. The controller allocates spare blocks of the non-volatile memory to provide a first active block and writes data issued by the host to the first active block. When the number of spare blocks is less than a threshold number and valid data of a first source block is less than a critical data amount, the controller uses the first active block as a data transfer destination for the valid data from the first source block.

In an exemplary embodiment, after completely transferring valid data from the first source block to the first active block and prior to closing the first active block, the controller releases the first source block as a spare block.

In an exemplary embodiment, when the number of spare blocks is less than the threshold number but the valid data of the first source block is not less than the critical data amount, the controller uses a second active block as a data transfer destination for the valid data from first source block. The controller allocates spare blocks of the non-volatile memory to provide a second active block that is different from the first active block.

In an exemplary embodiment, after completely transferring valid data from the first source block to the second active block, the controller maintains the first source block. The controller releases the first source block as a spare block when the second active block is closed.

In an exemplary embodiment, the controller uses a flag. After completely transferring the valid data from the first source block to the first active block, the flag is asserted to indicate that the first active block is responsible for collecting the valid data of the first source block and is prohibited from being a data transfer destination for valid data from a second source block. The valid data of the second source block is less than the critical data amount. A data transfer demand of the second source block occurs when the number of spare blocks is less than the threshold number again.

In an exemplary embodiment, after the first active block is closed, the controller allocates the spare blocks of the non-volatile memory to provide a third active block, writes data issued by the host to the third active block, and resets the flag, so that the controller uses the third active block as a data transfer destination for the valid data from the second source block.

In an exemplary embodiment, the controller limits the number of source blocks to be collected by the first active block.

In an exemplary embodiment, the critical data amount is the same as a write unit of the non-volatile memory.

In addition to a controller, the control of a non-volatile memory may be implemented by other structures. In an exemplary embodiment, a control method for non-volatile memory may be realized according to the aforementioned concepts, which includes the following steps: operating a non-volatile memory as requested by a host; allocating spare blocks of the non-volatile memory to provide a first active block and writing data issued by the host to the first active block; and when the number of spare blocks is less than a threshold number and valid data of a first source block is less than a critical data amount, the first active block is used as a data transfer destination for the valid data from the first source block.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. The following discussion uses flash memory as an example.

Today's data storage devices often use flash memory as the storage medium for storing user data from the host.

There are many types of data storage devices, including memory cards, USB flash devices, SSDs, and so on. In another exemplary embodiment, a flash memory may be packaged with a controller to form a multiple-chip package called eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Figure 1:
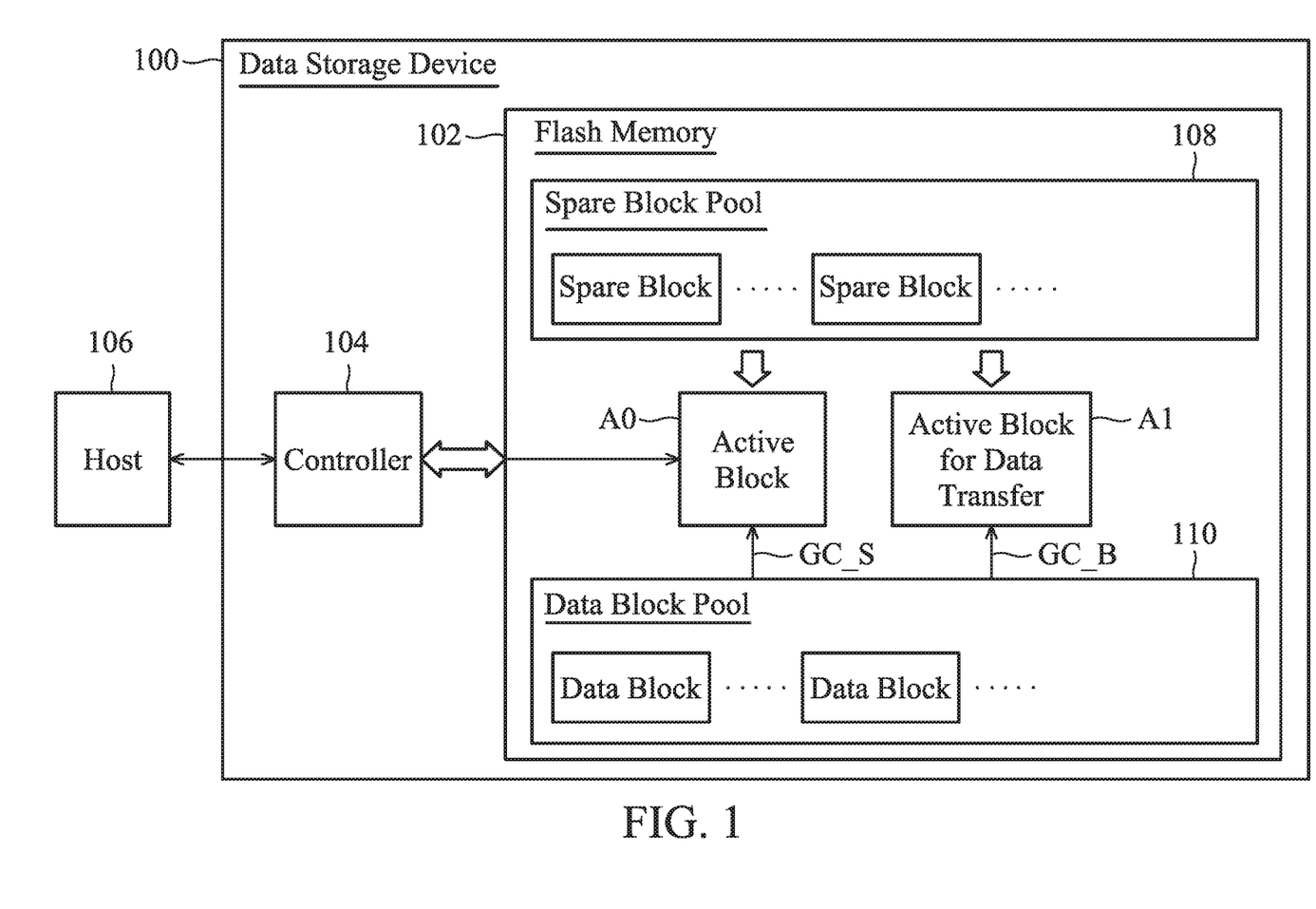
FIG. 1 is a block diagram depicting a data storage device 100 in accordance with an exemplary embodiment of the disclosure.

FIG. 1 is a block diagram depicting a data storage device 100 in accordance with an exemplary embodiment of the disclosure. The data storage device 100 includes a flash memory 102 and a controller 104. A host 106 accesses the flash memory 102 through the controller 104. The controller 104 receives and executes write commands from the host 106. To optimize the storage of the flash memory 102, the controller 104 further involves user data transfer within the flash memory 102 without commands from the host 106.

A flash memory has its special storage characteristics, as described below.

The host 106 distinguishes user data by logical address (e.g., logical block address LBA or global host page number GHP . . . etc.). The physical space in the flash memory 102 is divided into a plurality of blocks. Each block includes a plurality of pages. Each page includes N sectors, where N is an integer greater than 1, such as: 4. A 16 KB page may be divided into four sectors, each sector is 4 KB. In an exemplary embodiment, a block is allocated from a low to high page number to store user data.

In an exemplary embodiment, a data storage device adopts a multi-channel accessing technology. Blocks accessed through different channels may be managed as one super block, and pages of the different blocks may be managed as one super page. The data storage device managed in the units of super block (or super page) therefore has improved data throughput.

For storage of user data, the data storage device records the mapping between logical address of the user data and physical address storing the user data in a logical-to-physical mapping table (L2P Table).

The storage space in the flash memory needs to be erased before being allocated again to store data. The minimum unit of erasure is a block. There are data blocks, active blocks, and spare blocks. An active block may be selected from the spare blocks to store user data. When full, the active block is closed (e.g., by writing of EOB (end of block) information) and changed to a data block. As the user data is updated, old user data in the data blocks are invalidated. When only invalid data remains, a data block is erased and changed to a spare block. In another exemplary embodiment, the block erasure is performed later. A block in which only invalid data remains is first changed to a spare block and is erased when selected to serve as an active block.

The control of a flash memory involves data transfer between blocks, including data transfer for garbage collection and data transfer for purposes other than garbage collection. When the number of spare blocks is insufficient, garbage collection is required. In an exemplary embodiment, sparse pieces of valid data that remain in the blocks (called source blocks) may be collected in an active block (called a destination block). After garbage collection, source blocks are released, thereby increasing the number of spare blocks.

Data transfer for purposes other than garbage collection may be performed when there is a transfer requirement. In an exemplary embodiment, a data block containing ECC (error checking and correction) failed data may be regarded as a source block and the readable data is rescued and transferred to another block. In an exemplary embodiment, a data block read too frequently may be also regarded as a source block. Because the frequent reading may damage the data retention capability of a data block, an early move action is required to transfer data to another block. In an exemplary embodiment, data transfer may be performed because of wear leveling. For example, a block with a low read count may be regarded as a source block. Data in the source block may be moved to an active block (i.e. a destination block) that has a high erase count, thereby releasing rather than freezing the rarely used source block. In an exemplary embodiment, the concept of wear leveling is combined with garbage collection. Based on the wear leveling concept, valid data scattered on the source blocks is moved to an active block (destination block) having a high erase count.

It should be noted that the data transfer is preferably implemented by copying data to the destination.

This disclosure proposes a high-efficiency scheme for the valid data transfer carried out by garbage collection. A high-performance data storage method is shown, which enables the same active block to meet the needs of more than one type of data storage. In addition to storing user data from the host 106 (requested by the host 106 through a write command), small-amount garbage collection that moves valid data less than a critical amount is also transferred to the same active area.

In FIG. 1, the flash memory 102 has a pool 108 of spare blocks and a pool 110 of data blocks. The controller 104 selects one spare block from the spare block pool 108 for use as an active block. Accordingly, the number of spare blocks of the spare block pool 108 is reduced. User data is filled in the active block. After the active block is closed and becomes a data block, the number of data blocks increases.

The controller 104 typically uses an active block (labeled A0) to receive user data from the host 106 which is typically issued through a write command. In this disclosure, the active block A0 is also used as the destination block for small-amount garbage collection. For a source block with only a small amount of valid data (in comparison with a critical data amount), its valid data is collected into the active block A0. According to the conventional technology, an additional active block A1 is required to collect such a small amount of transferred data, different from the present invention. The design of the present invention is much more effective.

First, in the present case, the active block A0 can not only store the user data written by the host 106 through a write command, but also store a small amount of transferred data due to garbage collection. It reduces the usage of the spare blocks.

To deal with a sudden power failure, the active block A1 that has not been closed is abandoned during a sudden power-off recovery (SPOR) procedure for data reliability. Source blocks are accessed during the SPOR procedure to provide reliable user data. Therefore, as long as the active block A1 has not been closed, all source blocks of the data transfer must be retained and cannot be released. The aforementioned design obviously drags down the recycling of source blocks. The number of spare blocks cannot be increased over time. Other types of data transfer may be induced. However, the active block A0 is not discarded during the SPOR procedure. There is no need to maintain the source blocks for the SPOR procedure. The source blocks are released right after the data transfer and, accordingly, the number of spare blocks increases, which is good for operating the flash memory.

In particular, if the source block has only a small amount of valid data (less than a critical data amount), it takes less time to move. After such a small amount of valid data is completely moved from the source block to the active block A0, the source block is released and the number of spare blocks is replenished in time. The controller 104 may record the amount of valid data of each data block, and update the valid data amount of each data block in an immediate or periodic manner. In another exemplary embodiment, the valid data amount of each data block is updated when closing the active block A0.

According to the prior art, dummy data is filled to the active block A1 (that works as the destination block for data transfer) to close the active block A1 early. The data storage capacity, therefore, is reduced. The erasure frequency is increased, which shorten the life of flash memory. In the disclosure, the active block A0 is in a flexible use to work as the destination for small-amount data transfer, which can reduce the writing of dummy data and overcome the above problems.

As mentioned above, the data transfer may be due to garbage collection or other purposes. When the number of spare blocks is less than the threshold number TH1, the controller 104 starts the garbage collection process. The controller 104 selects a source block from the data block pool 110 and determines a valid data amount within the selected source block. When the amount of valid data within the source block is less than the critical data amount TH2, the controller 104 uses the active block A0 as the destination for the valid data transferred from the source block, as indicated by the arrow GC_S. When the valid data amount of the source block is not lower than the critical data amount, the controller 104 uses another active block A1 as the destination for the valid data transferred from the source block, as indicated by the arrow GC_B. In an exemplary embodiment, the controller 104 selects the data block having the minimum valid data as the source block. Note that the additional active block A1 is also selected from the spare block pool 108 and may involve valid data collection from more than one data block. After being closed, the active block A1 is pushed to the data block pool 110. The active block A1 is not limited to garbage collection, and can also cope with the data transfer due to error correction failure, early move, wear leveling, or the like.

In an exemplary embodiment, the controller 104 limits the number of source blocks (e.g., only one source, or source blocks less than a particular number) to be collected to the same active block A0. In this manner, the number of source blocks using the active block A0 as the destination for data transfer is limited. No excessive blocks are released in succession. The number of spare blocks fluctuates steadily.

In an exemplary embodiment, a flag, cleanflag, is introduced to determine using the garbage collection path GC_S or GC_B.

Figure 2A:
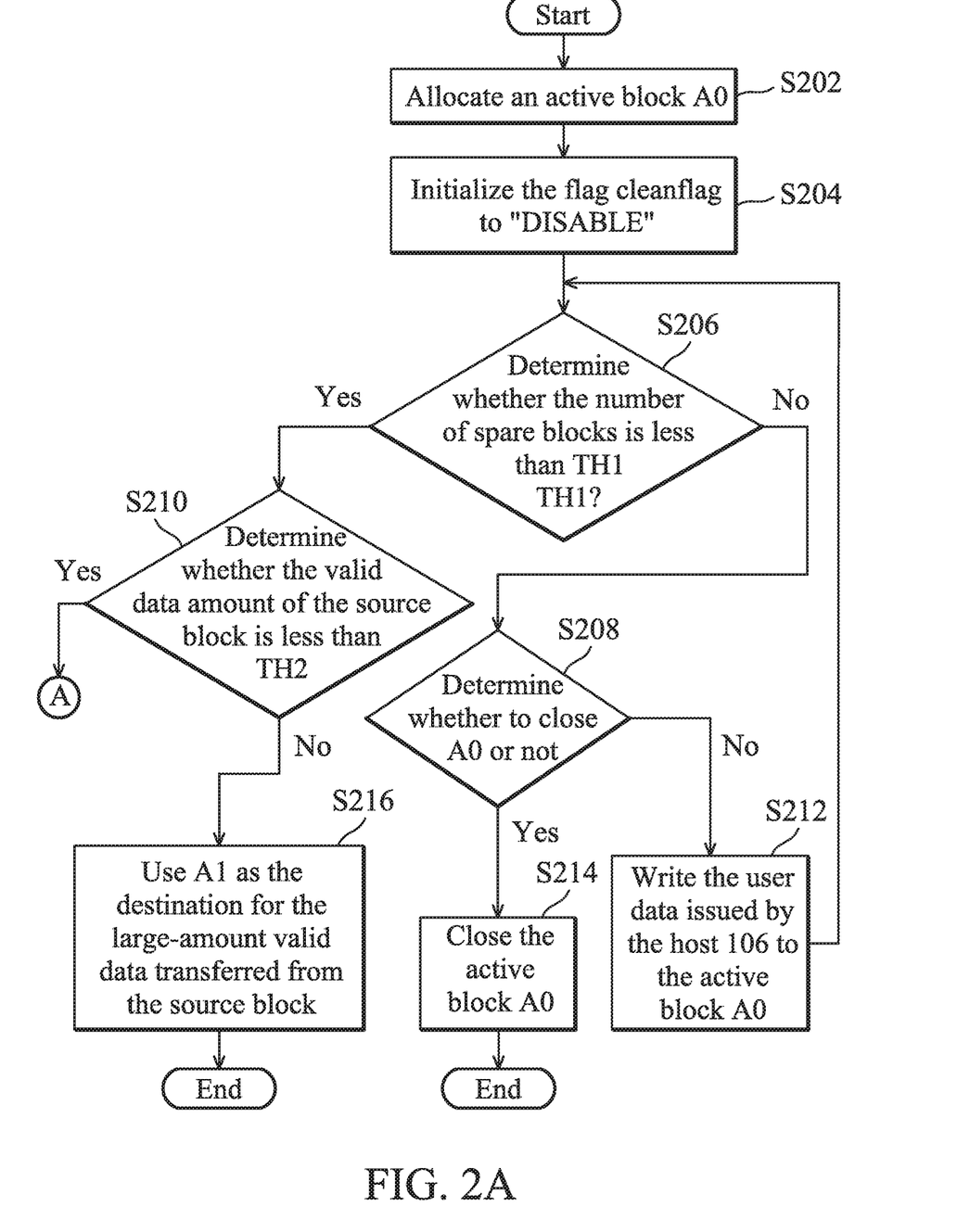
FIG. 2A and FIG. 2B show a flowchart illustrating a high-performance data storage method implemented in accordance with an exemplary embodiment of the present invention, wherein a flag, cleanflag, is utilized to use the garbage collection path GC_S or GC_B for data transfer.
Figure 2B:
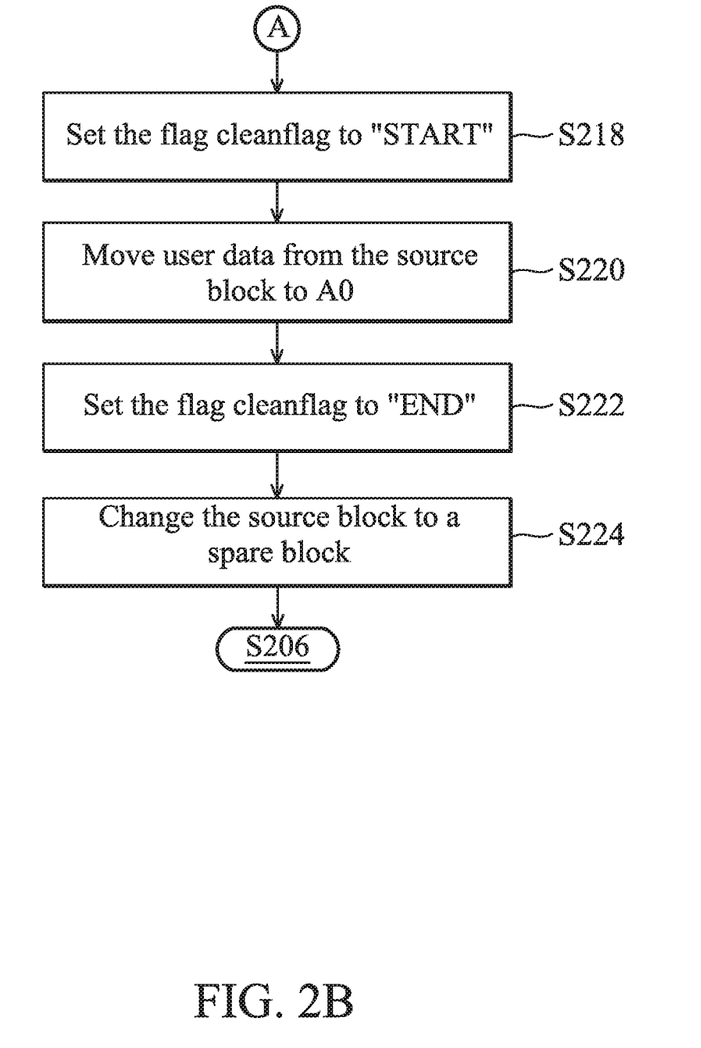

FIGS. 2A and 2B show a flowchart illustrating a high-performance data storage method implemented in accordance with an exemplary embodiment of the present invention, wherein a flag, cleanflag, is utilized to use the garbage collection path GC_S or GC_B for data transfer.

In step S202, the controller 104 allocates an active block A0. The controller 104 selects one spare block from the pool 108 of spare blocks as the active block A0.

In step S204, the controller 104 initializes the flag cleanflag to "DISABLE". The "DISABLE" state means that the active block A0 has not been used as the destination for a valid data transfer from any source block.

In step S206, the controller 104 determines whether the number of spare blocks is less than a threshold number TH1. If not, the controller 104 determines that the flash memory 102 has no need for garbage collection and step S208 is performed. If yes, step S210 is performed.

In step S208, the controller 104 determines whether to close the active block A0 or not. If yes, step S214 is performed, and if not, step S212 is performed. When the active block A0 still has spare space to store data, the controller 104 does not close the active block A0.

In step S212, the controller 104 writes the user data issued by the host 106 to the active block A0, and then returns to step S206. Between the active block A0 receiving the data issued by the host 106, the controller 104 may intersperse various operations on the flash memory 102, so that the number of spare blocks is reduced, and a need for garbage collection is derived. The monitor step S206 is to cope with this situation.

In step S214, the controller 104 closes the active block A0. When the active block A0 has no spare space for data storage, the controller 104 closes the active block A0 and writes EOB information to the last page of the active block A0. The active block A0 becomes a data block.

According to the need confirmed in step S206 for garbage collection, step S210 is performed. The controller 104 determines whether the valid data amount of the source block is less than a critical data amount TH2. The controller 104 determines in this step whether the upcoming garbage collection is for small-amount data transfer. If yes, the flow proceeds to the steps of FIG. 2B. If no, the flow proceeds to step S216.

In step S216, the controller 104 uses the active block A1 as the destination for valid data transferred from the source block. Large-amount data transfer due to garbage collection is performed in this step. In an exemplary embodiment, the controller 104 returns to step S206 to monitor if the need for garbage collection occurs again.

Steps S218 to S224 of FIG. 2B are performed for small-amount data transfer due to garbage collection. In step S218, the controller 104 sets the flag cleanflag to "START" to use the active block A0 as the destination block for data transfer. "START" shows that the controller 104 is ready to perform data transfer.

In step S220, the controller 104 moves user data from the source block to the active block A0. When the valid data in the source block cannot be completely transferred from the source block to the destination block at one time, the controller 104 can move the valid data in the source block to the active block A0 in sections, interspersed with commands from the host 106. For example, between the segmented garbage collection, user data issued by the host 106 may be written to the active block A0.

In step S222, the controller 104 sets the flag cleanflag to "END" to indicate that the active block A0 has been used as a valid data transfer destination for a certain source block, different from the "Disable" status. When the need for small-amount garbage collection occurs again in the use of the same active block A0, the flag status "END" can prevent the controller 104 from using the same active block A0 as the destination block of another source block. The new small-amount garbage collection may be performed when the active block A0 is closed and updated by another spare block.

In step S224, the controller 104 changes the source block to a spare block, and the number of spare blocks is increased by one. Step S224 does not depend on whether the active block A0 is closed or not. The number of spare blocks can be replenished in time. In contrast, those source blocks using the active block as destination (step S216) must be maintained till the active block A1 is closed. The technique of transferring valid data from a source block to the active block A0, obviously, has its advantages. Specifically, the source data to be collected to the active block A0 has limited valid data, so that the time required for data transfer is short. A source block can be quickly changed into a spare block. Thus, steps S218 to S224 produce significant benefits in comparison with step S216.

The user may be in the habit of repeatedly powering down and up a device (referred to as power cycling). For example, a mobile phone user may flip the phone cover to check messages. A lot of spare blocks are consumed in power cycling. A need for garbage collection arises. According to the disclosure, the insufficient spare blocks are replenished in time.

Figure 3A:
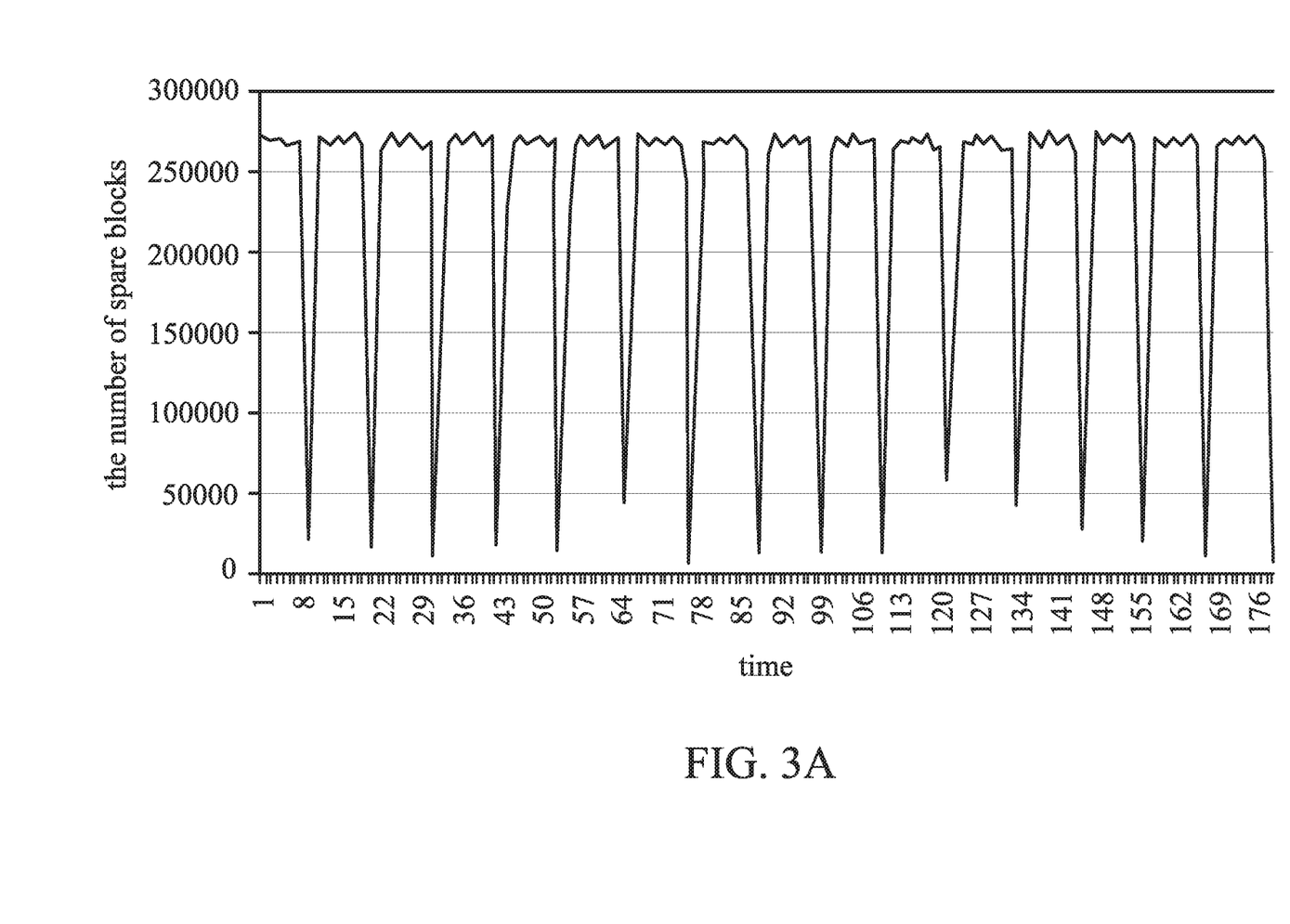
FIGS. 3A and 3B show how the number of spare blocks of flash memory 102 can vary in the different techniques.
Figure 3B:
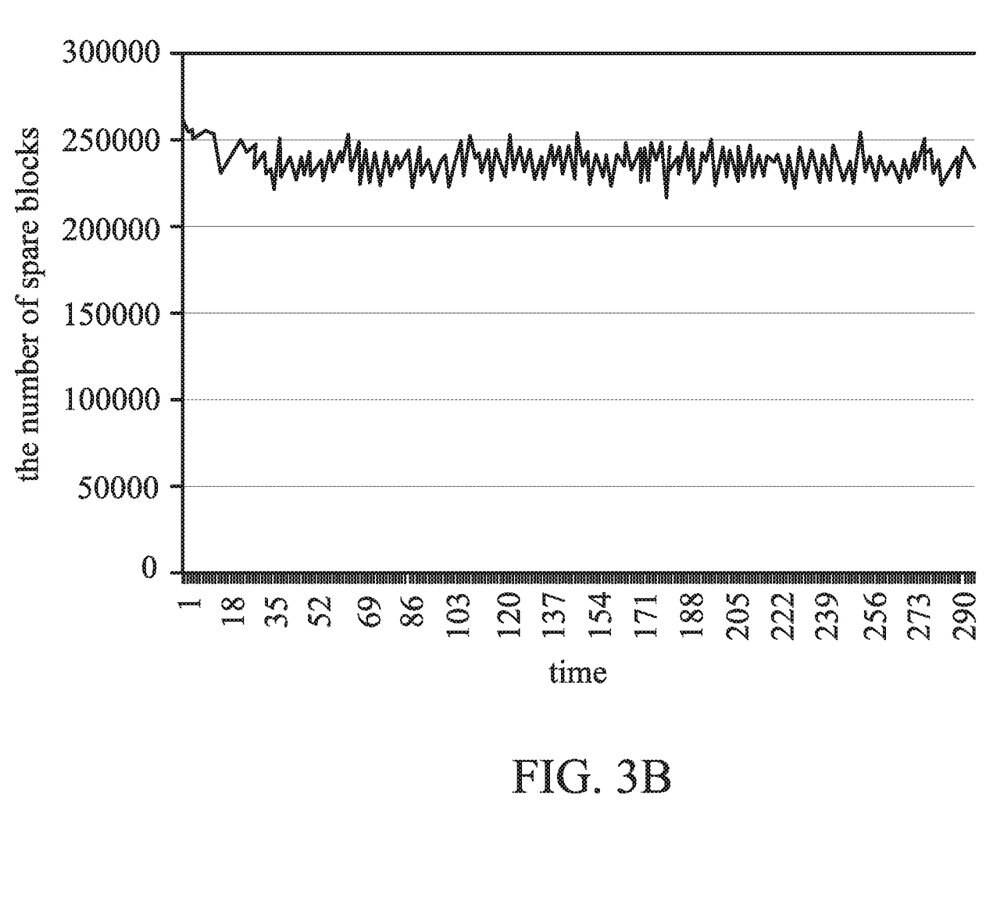

FIGS. 3A and 3B show how the number of spare blocks of flash memory 102 can vary in the different techniques.

Referring to FIG. 3A, all kinds of garbage collection collects valid to the active block A1 (different from the active block A0 which is allocated to store user data issued by host 106). Referring to FIG. 3B, the active block A0 share the work of garbage collection. In FIG. 3A, the number of spare blocks will drop dramatically before being increased. In FIG. 3B, the fluctuation is small. Whenever the number of spare blocks is not enough, some blocks are released to make up the spare blocks.

In an exemplary embodiment, the limited number of source blocks to be collected by the active block A0 is more than one.

In an exemplary embodiment, the flag, cleanflag, is not required. The active block A0 does not limit the number of collected source blocks.

In an exemplary embodiment, the number of spare blocks decreases when all writing on the active block A0 is completed. According to the decremented number, it is determined whether to assert a flag for garbage collection. In step S206, the flag for garbage collection is checked. When the flag is asserted, the flow proceeds to step S210.

In an exemplary embodiment, the critical data amount TH2 is the same as one write unit. For example, the critical data amount TH2 may be equal to one page 16 KB, or one super page 64 KB; avoid excessive occupation of the active block A0 for garbage collection.

The operations that the controller 104 performs on the flash memory 102 may be implemented by other structures. Any technology that uses the active block A0 for small-amount garbage collection should be considered as within the scope of the present invention. In this case, the control method of the non-volatile memory can be realized by the foregoing concept.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, operating the non-volatile memory as requested by a host,
wherein:
the controller allocates spare blocks of the non-volatile memory to provide a first active block and writes data issued by the host to the first active block;
when the number of spare blocks is less than a threshold number and valid data of a first source block is less than a critical data amount, the controller uses the first active block as a data transfer destination for the valid data from the first source block and thereby the first active block is shared by the data issued by the host and the valid data collected from the first source block;
after completely transferring valid data from the first source block to the first active block and prior to closing the first active block, the controller releases the first source block as a spare block;
the controller uses a flag;
after completely transferring the valid data from the first source block to the first active block, the flag is asserted to indicate that the first active block is responsible for collecting the valid data of the first source block and is prohibited from being a data transfer destination for valid data from a second source block;
the valid data of the second source block is less than the critical data amount; and
a data transfer demand of the second source block occurs when the number of spare blocks is less than the threshold number again.

2. The data storage device as claimed in claim 1, wherein:
when the number of spare blocks is less than the threshold number but the valid data of the first source block is not less than the critical data amount, the controller uses a second active block as a data transfer destination for the valid data from the first source block; and
the controller allocates spare blocks of the non-volatile memory to provide the second active block that is different from the first active block.

3. The data storage device as claimed in claim 2, wherein:
after completely transferring valid data from the first source block to the second active block, the controller maintains the first source block; and
the controller releases the first source block as a spare block when the second active block is closed.

4. The data storage device as claimed in claim 1, wherein:
after the first active block is closed, the controller allocates the spare blocks of the non-volatile memory to provide a third active block, writes data issued by the host to the third active block, and resets the flag, so that the controller uses the third active block as a data transfer destination for the valid data from the second source block.

5. The data storage device as claimed in claim 1, wherein:
the controller limits the number of source blocks to be collected by the first active block.

6. The data storage device as claimed in claim 1, wherein:
the critical data amount is the same as a write unit of the non-volatile memory.

7. A non-volatile memory control method, comprising:
operating a non-volatile memory as requested by a host;
allocating spare blocks of the non-volatile memory to provide a first active block and writing data issued by the host to the first active block;
when the number of spare blocks is less than a threshold number and valid data of a first source block is less than a critical data amount, the first active block is used as a data transfer destination for the valid data from the first source block and thereby the first active block is shared by the data issued by the host and the valid data collected from the first source block;
after completely transferring valid data from the first source block to the first active block and prior to closing the first active block, releasing the first source block as a spare block;
using a flag;
after completely transferring the valid data from the first source block to the first active block, asserting the flag to indicate that the first active block is responsible for collecting the valid data of the first source block and is prohibited from being the data transfer destination for the valid data from a second source block;
the valid data of the second source block is less than the critical data amount; and
a data transfer demand of the second source block occurs when the number of spare blocks is less than the threshold number.

8. The non-volatile memory control method as claimed in claim 7, further comprising:
when the number of spare blocks is less than the threshold number but the valid data of the first source block is not less than the critical data amount, using a second active block as a data transfer destination for the valid data from the first source block,
wherein the spare blocks of the non-volatile memory are allocated to provide the second active block that is different from the first active block.

9. The non-volatile memory control method as claimed in claim 8, further comprising:
after completely transferring valid data from the first source block to the second active block, maintaining the first source block; and
releasing the first source block as a spare block after closing the second active block.

10. The non-volatile memory control method as claimed in claim 7, further comprising:
after closing the first active block, allocating the spare blocks of the non-volatile memory to provide a third active block, writing data issued by the host to the third active block, and resetting the flag to use the third active block as a data transfer destination for the valid data from the second source block.

11. The non-volatile memory control method as claimed in claim 7, further comprising:
limiting the number of source blocks to be collected by the first active block.

12. The non-volatile memory control method as claimed in claim 7, wherein:
the critical data amount is the same as a write unit of the non-volatile memory.

\* \* \* \* \*